United States Patent

Rensvold

[15] 3,705,782

[45] Dec. 12, 1972

[54] DESTRUCTION OF OIL SLICKS

[72] Inventor: Roger F. Rensvold, Duncan, Okla.

[73] Assignee: Halliburton Company, Duncan, Okla.

[22] Filed: July 22, 1971

[21] Appl. No.: 165,354

[52] U.S. Cl. ...................................431/7, 431/326
[51] Int. Cl. ..............................................F23d 3/18
[58] Field of Search......210/83, 242, DIG. 21; 431/2, 431/4, 7, 326

[56] References Cited

UNITED STATES PATENTS

| | | | |
|---|---|---|---|
| 3,661,495 | 5/1972 | Johnston | 431/7 |
| 3,589,844 | 6/1971 | Kraemer | 431/8 |
| 3,556,698 | 1/1971 | Tully | 431/2 |
| 1,087,112 | 2/1914 | Fiedler | 431/2 X |

*Primary Examiner*—William F. O'Dea
*Assistant Examiner*—W. C. Anderson
*Attorney*—John H. Tregoning et al.

[57] ABSTRACT

An oil slick is destroyed by applying thereto finely divided particles of a compound capable of generating a combustible gas, upon contact with water, allowing the particles to contact the underlying body of water so that bubbles of combustible gas rise through the oil film and admix therewith, so as to enhance the combustibility of the oil, and then igniting the oil-gas mixture to burn and destroy the film, e.g. calcium carbide to form acetylene gas.

4 Claims, No Drawings

DESTRUCTION OF OIL SLICKS

The removal and destruction of oil slicks and spills from the surface of bodies of water such as rivers, harbors, bays, and lakes has become a matter of great concern owing to the actual and potential damage such spills may inflict upon the shore line, marine and wildlife, sea birds, and the general ecology of the area in which the spill occurs.

A variety of physical and chemical methods have been proposed, some of which have been put to use, in the removal of oil spills, such as those occurring from disabled vessels or from offshore oil or gas drilling platforms, but these have been characterized by great expense and time, and only moderate efficiency of removal. Among the numerous removal techniques which have been suggested in the prior art is that of burning off the oil slick. Previously published information, e.g., "Combating Pollution Created by Oil Spills," Volume 1: Methods, pages 79–85, published by Arthur D. Little, Inc., has indicated that the ignition and sustained burning of oil in thin films on the surface of water is either difficult or impossible owing to heat losses to the underlying body of water exceeding the heat input to the oil film from combustion. Moreover, thin oil films rapidly lose their more volatile components, thereby rendering the remaining oil more difficult to ignite, or to sustain combustion if ignited.

In accordance with the present invention there is provided a novel method for the removal and destruction of an oil film or slick on the surface of a body of water by combustion of the oil in situ. The method comprises the steps of (a) increasing the combustibility of the oil film by incorporating therein a readily ignitable and combustible gas such as a hydrocarbon gas, or hydrogen gas and (b) igniting the oil film containing the combustible gas in the presence of atmospheric oxygen, whereby the oil film is converted to carbon dioxide and water and destroyed.

The hydrocarbon gas which is to be incorporated in the oil film in order to improve its combustibility, in accordance with the invention, is advantageously a gas which can be generated in situ, for example, by the action of water upon a solid composition. In accordance with a presently preferred embodiment of the invention, the hydrocarbon gas is acetylene, which is generated in situ by depositing finely divided particles of calcium carbide upon the surface of the oil slick.

The particles of calcium carbide settle by gravity through the oil film, and contact the underlying water, whereby the acetylene gas is generated. The gas rises in the form of finely divided bubbles, contacting and passing through the oil film. Since the acetylene is more soluble in the oil than in water, the dissolved gas bubbles tend to accumulate in the oil film and to saturate it. Any undissolved gas rises above the oil film into the atmosphere, becoming admixed with atmospheric oxygen.

For effective and rapid generation of acetylene, the calcium carbide is applied in finely divided form, preferably having an average particle size in the range of about 0.01 to 0.05 inch, but the particle size should be one which produces an acetylene gas bubble of a size rendering it readily soluble in the oil.

The specific gravity of commercial calcium carbide is of the order of 2.2, and gas yields therefrom are of the order of 4.6 to 4.8 cubic feet per pound at 60°F. The customary precautions in handling calcium carbide must be observed. The carbide can be applied by scattering of the powdered material, or by employing a perforated canister provided with float chamber, or by employing buoyant mesh bags. The sole product from the reaction between calcium carbide and water is calcium hydroxide, which eventually is converted to calcium carbonate, the latter being essentially harmless to marine life.

The ignition of the oil-hydrocarbon gas mixture may be accomplished by a variety of means, such as floating flares dropped from aircraft, or incendiary projectiles fired from a floating vessel. Also there can be used an ignition device integral with the carbide canister, containing a material activated by contact with water, such as sodium metal. In the case of a large oil slick, bombs equipped with proximity fuses and loaded with calcium carbide particles can be used to scatter the carbide from a point near the center of the slick.

Thus, in its broad aspect, the method of the invention involves applying to the upper surface of the oil slick or film finely divided particles of a compound capable of generating a combustible gas upon contact with water, allowing the particles to contact the underlying body of water, so that the bubbles of gas thus generated rise through the oil film and admix with and enhance the combustibility of the oil.

Besides the alkyne hydrocarbon gases, such as acetylene, there may also be employed for the purposes of the present invention, lower alkane and lower alkene hydrocarbons, such a methane, ethane, and ethylene. Thus, methane may be generated by contacting aluminum carbide with water in accordance with the reaction:

$$Al_4C_3 + 12H_2O \rightarrow 3\,CH_4 + 4\,Al(o)OH \cdot H_2O$$

some hydrogen being generated at the same time. Ethane may be generated by contacting water with an organozinc compound such as zinc diethyl in accordance with the reaction:

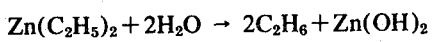

$$Zn(C_2H_5)_2 + 2H_2O \rightarrow 2C_2H_6 + Zn(OH)_2$$

or with a Grignard reagent such as ethyl magnesium iodide, in accordance with the equation:

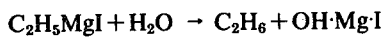

$$C_2H_5MgI + H_2O \rightarrow C_2H_6 + OH \cdot MgI$$

Since zinc diethyl is a liquid, at ordinary temperatures, it may be applied absorbed on a suitable porous carrier such as diatomaceous earth. However, it can be applied in the form of a spray, the liquid particles, having a specific gravity of 1.2, hence heavier than the oil or the water, passing downward to the underlying body of water and reacting therewith on contact.

A metal hydride, such as calcium hydride, $CaH_2$, which will react with water to generate hydrogen, may also be employed as a source of combustible gas.

U.S. Pat. No. 1,325,293 (1919), describes cleaning oil wells to remove incrustations or paraffin wax, by including in the aqueous alkaline cleaning solvent for the wax, a small amount of calcium carbide to generate acetylene gas for its agitating action, some heat being produced at the same time. It will be appreciated, however, that this patent deals with a specifically different problem, and that the removal of the wax is accomplished without combustion, which would be out of the question in treating an oil well.

The proportion of gas-generating reagent to the amount of oil to be destroyed is not critical, except that there must be employed at least a sufficient amount to generate the quantity of hydrocarbon gas required to substantially completely combust the oil present.

The following examples, which are not to be considered as limiting, will service to illustrate the practice of the invention.

EXAMPLE I

A 1-gallon glass container is half filled with water, and there is applied to the surface of the water an amount of heavy fuel oil (Bunker No. 2) sufficient to form a thin film. Particles of calcium carbide having an average diameter of about 0.01 inch are dusted over the surface of the oil film. The particles, as observed through the glass wall of the container, sink through the oil film into the underlying body of water. Immediately upon contacting the water, bubbles of acetylene are generated, which rise into the film and mix with the oil. As the reaction proceeds the carbide particles are consumed and reduced in size, going down into the water a short distance and then being propelled upward by the buoyancy of the acetylene gas. Despite the high flash point of the oil (above 150°F), the acetylene-oil mixture ignited when an open flame is contacted therewith, and combustion is sustained until the oil is substantially completely consumed.

EXAMPLE II

A metal pan having dimensions of 10 × 10 × 2 inches is used to contain 1,000 grams tap water and 150 grams San Andres crude oil. The pan and its contents are weighed and the weight is recorded. A gas flame is played over the surface of the oil in an attempt to ignite it. The oil is not observed to burn. Then, 20 grams finely divided calcium carbide is sprinkled on the surface of the oil. Bubbles of acetylene gas are observed breaking through the surface of the oil. The gas flame is again applied, and the bubbles of acetylene breaking through the oil surface are ignited. Within 15 seconds the combustion is observed to spread to the oil film, which is observed to burn vigorously and to continue burning after the gas flame is removed. The pan and its contents are weighed after the fire is observed to have died out. By difference, it is determined that the oil is substantially completely burned.

What is claimed is:

1. Method for the removal and destruction of an oil slick or film upon the surface of a body of water comprising the steps of:
    a. applying to the upper surface of the oil film finely divided particles of a compound capable of generating a combustible gas upon contact with water;
    b. allowing said particles to contact the underlying body of water so that the bubbles of gas thus generated rise through the oil film and admix with and enhance the combustibility of the oil; and
    c. igniting the oil-combustible gas mixture formed in step (b) whereby the oil is substantially completely burned and destroyed.
2. The method of claim 1 in which the gas generating compound has a specific gravity greater than that of the oil.
3. The method of claim 1 in which the gas generating compound is calcium carbide and the combustible gas is acetylene.
4. The method of claim 1 in which the gas generating compound is applied in a quantity at least sufficient to generate combustible gas sufficient to substantially completely combust the oil present.

* * * * *